(12) United States Patent
Bassett et al.

(10) Patent No.: US 11,746,509 B2
(45) Date of Patent: Sep. 5, 2023

(54) BACKFLOW PREVENTION DEVICE

(71) Applicants: Kenny Bassett, Columbia, MO (US);
Delvin Mellerup, Clark, MO (US)

(72) Inventors: Kenny Bassett, Columbia, MO (US);
Delvin Mellerup, Clark, MO (US)

(*) Notice: Subject to any disclaimer, the term of this patent is extended or adjusted under 35 U.S.C. 154(b) by 5 days.

(21) Appl. No.: 17/464,342

(22) Filed: Sep. 1, 2021

(65) Prior Publication Data

US 2023/0065329 A1   Mar. 2, 2023

(51) Int. Cl.
*E03B 7/07* (2006.01)
*F16K 27/02* (2006.01)
*F16K 15/04* (2006.01)

(52) U.S. Cl.
CPC ............ *E03B 7/077* (2013.01); *F16K 15/044* (2013.01); *F16K 27/0209* (2013.01)

(58) Field of Classification Search
CPC ...... E03B 7/077; F16K 15/042; F16K 15/063; F16K 17/18; Y10T 137/7772; Y10T 137/7773; Y10T 137/86831; Y10T 137/7841; Y10T 137/7838
See application file for complete search history.

(56) References Cited

U.S. PATENT DOCUMENTS

| | | | | |
|---|---|---|---|---|
| 2,306,012 A | * | 12/1942 | Campbell | F16K 15/042 251/360 |
| 2,569,734 A | * | 10/1951 | Saalfrank | F04B 43/086 285/368 |
| 2,928,413 A | * | 3/1960 | Hansen | F16K 17/19 137/526 |
| 4,518,006 A | * | 5/1985 | Hoffmann | E03C 1/104 137/107 |
| 5,947,147 A | | 9/1999 | Gnauret et al. | |
| 8,297,300 B2 | | 10/2012 | Bejerano | |
| 8,627,847 B2 | | 1/2014 | Montague | |
| 9,587,752 B2 | | 3/2017 | Montague | |
| 2006/0081293 A1 | | 4/2006 | Santa Cruz et al. | |

FOREIGN PATENT DOCUMENTS

DE   202014105292 U1 * 3/2016 ............. E03B 7/077

* cited by examiner

*Primary Examiner* — Reinaldo Sanchez-Medina
*Assistant Examiner* — Nicole Gardner
(74) *Attorney, Agent, or Firm* — Stinson LLP

(57) ABSTRACT

A backflow prevention device includes a piston received in a device passage between an inlet port and outlet port. A relief port can fluidly communicate with a middle segment of the device passage. The piston is movable between a normal flow position in which the piston blocks fluid communication between the relief port and the middle segment of the device passage and a backflow position in which the piston allows fluid communication between the relief port and the middle segment of the device passage. The piston can move to the normal position in response to normal flow through the device passage from the inlet port toward the outlet port and configured to move to the backflow position in response to greater pressure in the middle segment than in the inlet port.

25 Claims, 8 Drawing Sheets

BACKFLOW PREVENTION DEVICE

FIELD

The present disclosure pertains to a backflow prevention device.

BACKGROUND

Various backflow prevention devices are in wide residential and commercial use. Generally, backflow prevention devices prevent backflow from a water user into a community water supply. For high hazard applications, the standard backflow prevention device is a reduced pressure zone device (RPZ).

An RPZ is essentially a double check valve with a hydraulically actuated, normally open relief valve connected between the upstream side of the upstream check valve and a chamber between the upstream and downstream check valves. The upstream check valve is yieldably biased to a closed position by a five-psi spring, the downstream check valve is yieldably biased to a closed position by one-psi spring, and the relief valve is yieldably biased to an open position by a spring that is at least three psi less than the spring of the upstream check valve. The RPZ is installed between a water supply and a high hazard user. At the onset of normal flow through the device, first the relief valve is closed, then the upstream check valve is opened, and lastly the downstream check valve is opened. Typically, the spring forces that must be overcome to drive water across an RPZ accumulate to six to ten psi of pressure loss between the inlet and the outlet. The inventors have recognized that the inherent loss of six to ten psi of supply pressure can adversely affect water supply to the user. This pressure loss can lead to inadequate water supply, particularly to upper stories of a tall building, and in cases where the RPZ is retrofit to an older building with systems that did not account for the inherent pressure loss of an RPZ in the initial design.

Although the RPZ is ostensibly intended to protect against backflow into the supply, the inventors have recognized that, in the conventional design, even small decreases in supply pressure that do not result in backflow can open the relief valve. Some RPZs discharge water through the relief port frequently in response to common pressure fluctuation events. These events typically pose no risk of backflow. Moreover, RPZs are intended to utilize leakage from the relief port as an indication of a failed-open check valve. Thus, best practices dictate that any time a leak is observed, the RPZ should undergo testing to confirm the operational state of the check valve. However, testing an RPZ is costly, requiring a specially trained technician who uses an application-specific gauge set. Because leakage due to pressure fluctuations are common, many users forgo testing when leakage is observed.

An RPZ also must be installed horizontally to function. The inventors believe such installations consume an excessive amount of space. Moreover, the inventors have recognized that horizontal installation makes the check valves prone to failing open due to entrapped debris.

SUMMARY

In one aspect, a backflow prevention device comprises a device body having an inlet end portion and an outlet end portion opposite the inlet end portion. The inlet end portion defines an inlet port. The outlet end portion defines an outlet port. The device body defines a device passage connecting the inlet port to the outlet port. A piston is received in the device passage between inlet port and the outlet port. The device passage comprises a middle segment between the piston and the outlet port and the device body defines a relief port configured for fluid communication with the middle segment of the device passage. The piston is movable between a normal flow position in which the piston blocks fluid communication between the relief port and the middle segment of the device passage and a backflow position in which the piston allows fluid communication between the relief port and the middle segment of the device passage. The piston is configured to move to the normal position in response to normal flow through the device passage from the inlet port toward the outlet port and configured to move to the backflow position in response to greater pressure in the middle segment than in the inlet port.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
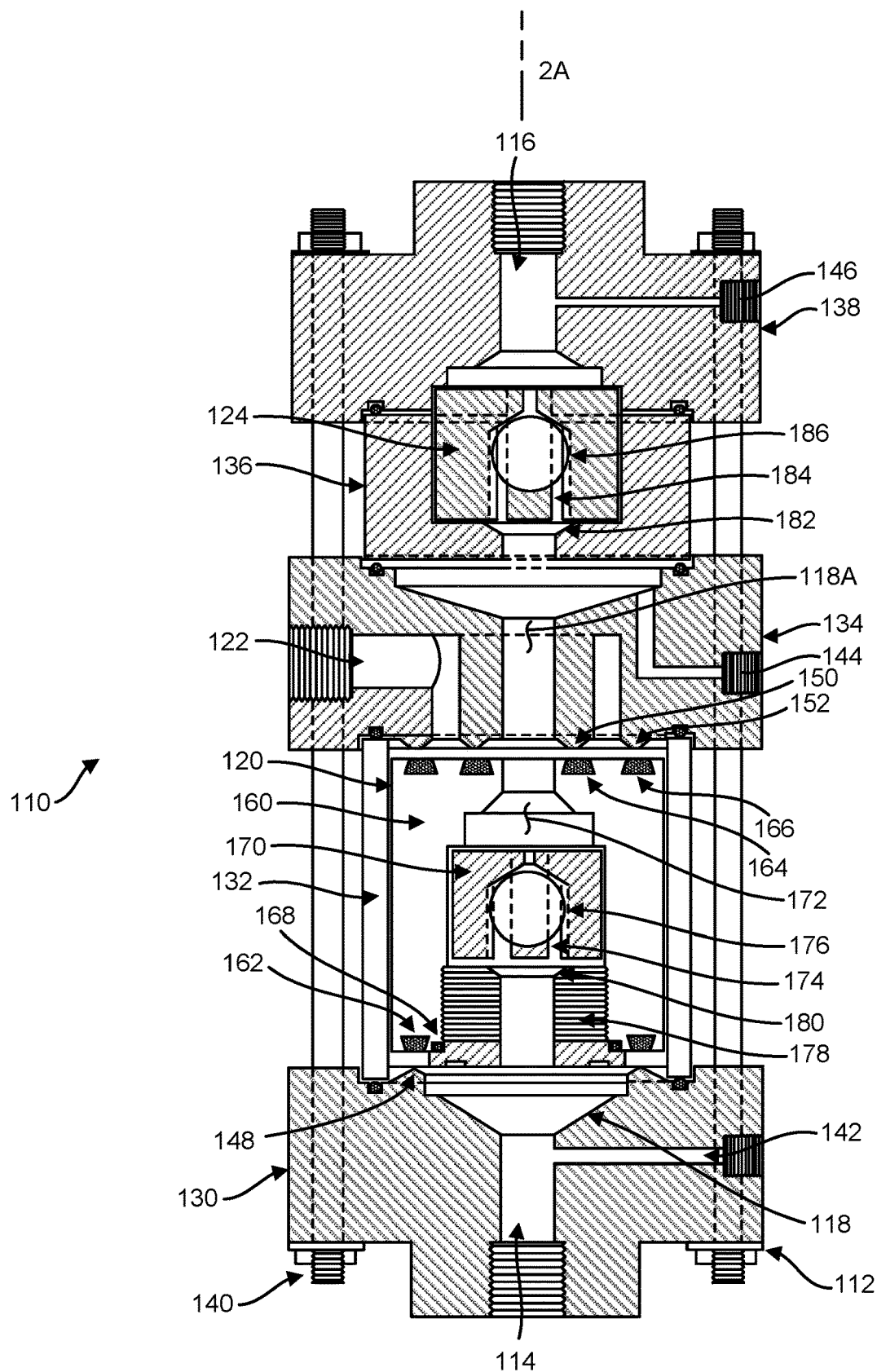
FIG. 1 is a longitudinal cross section of backflow prevention device.

Referring now to FIGS. 1-5, an exemplary embodiment of a backflow prevention device is generally indicated at reference number 110. The backflow prevention device 110 broadly comprises a device body 112 having an inlet end portion and an opposite outlet end portion 112B spaced apart along an axis A. The inlet end portion defines an inlet port 114 configured to couple to a water supply, the outlet end portion defines an outlet port 116 configured to couple to a water user, and the device body 112 defines a device passage 118 connecting the inlet port to the outlet port such that the water user can draw water from the water supply through the device passage. A piston 120 is located along the device passage 118 between the inlet port 114 and the outlet port 116. The device passage 118 comprises a middle segment 118A between the piston 120 and the outlet port 116, and the device body 112 defines a relief port 122 configured for fluid communication with the middle segment of the device passage. As will be explained in further detail below, the piston 120 functions as a moveable valve member. The piston 120 is movable between a normal flow position (FIG.

1A) in which the piston blocks fluid communication between the relief port 122 and the middle segment 118A of the device passage 118 and a backflow position (FIG. 1B) in which the piston allows fluid communication between the relief port and the middle segment of the device passage. In the illustrated embodiment, the backflow prevention device 110 further comprises a downstream check valve 124 along the device passage 118. The downstream check valve 124 is located between the middle segment 118A of the device passage 118 and the outlet port 116. The downstream check valve 124 is configured to close during back flow to create a fluid gap (vacuum break) between the downstream check valve and the piston. The fluid gap is vented to atmosphere through the relief port 122, thereby isolating the water supply from hazardous material that may backflow from the premises of the water user.

In the illustrated embodiment, the valve body 112 comprises a set of valve body members 130, 132, 134, 136, 138 held together end-to-end by a set of draw rods 140. More particularly, the illustrated valve body comprises an inlet member 130 that defines the inlet port 114, a piston chamber body member 132 that receives the piston 120, a relief port body member 134 that defines the relief port 122, a downstream check valve body member 136 that receives the downstream check valve 124, and an outlet body member 138 that defines the outlet port 116. Each of the body members 130, 132, 134, 136, 138 defines a respective segment of the device passage 118, and a set of compressible gaskets are positioned between each adjacent pair of body member ends. The gaskets seal the device passage 118 against egress of fluid radially outward through the interfaces between the body members 130, 132, 134, 136, 138 once the draw rods 140 are tightened. In the illustrated embodiment, the inlet body member 130, the relief port body member 134, and the outlet body member 138 define draw rod openings that are configured to align for reception of the draw rods 140. A nut can be tightened onto at least one end of each draw rod to assemble the valve body 112. The relief port 122 opens radially through the relief port body 134 at a location that is circumferentially offset from the draw rods (see FIG. 5). In addition, each of the inlet body member 130, the relief port body member 134, and the outlet body member 138 defines a respective test port 142, 144, 146 that opens radially from the respective segment of the device passage 118 through the perimeter of the respective body member at a location circumferentially spaced from the draw rods 140 (see FIG. 5). Each test port 142, 144, 146 is configured to couple a respective test cock (not shown).

The inlet body member 130 has an upstream end portion and a downstream end portion spaced apart along the axis A. The upstream end portion defines the inlet port 114, and the downstream end portion that defines a backflow valve seat 148. An inlet segment of the device passage 118 extends along the axis A from the inlet port 114 and opens through the downstream end portion radially inboard of the backflow valve seat 148.

The relief port body member 134 has an upstream end portion and a downstream end portion spaced apart along the axis A. The upstream end portion of the relief port body member 134 defines a relief valve seat 150, 152. The illustrated relief valve seat comprises first and second concentric annular valve seat portions 150, 152. The relief port 122 includes an upstream section that opens axially through the upstream end portion of the relief port body member 134 at a location radially between the first and second concentric annular valve seat portions 150, 152 and a downstream section that extends radially from the upstream section and opens through the perimeter of the relief port body member 134. In the illustrated embodiment, the upstream section of the relief port 122 comprises an annular pocket extending along the axis from the upstream end portion. The middle segment 118A of the device passage 118 extends along the axis A from the upstream end portion through the downstream end portion for providing fluid communication between the piston chamber body member 132 and the downstream check valve body member 136. The middle segment 118A is located radially inboard of the inner valve seat portion 150.

Figure 1A:
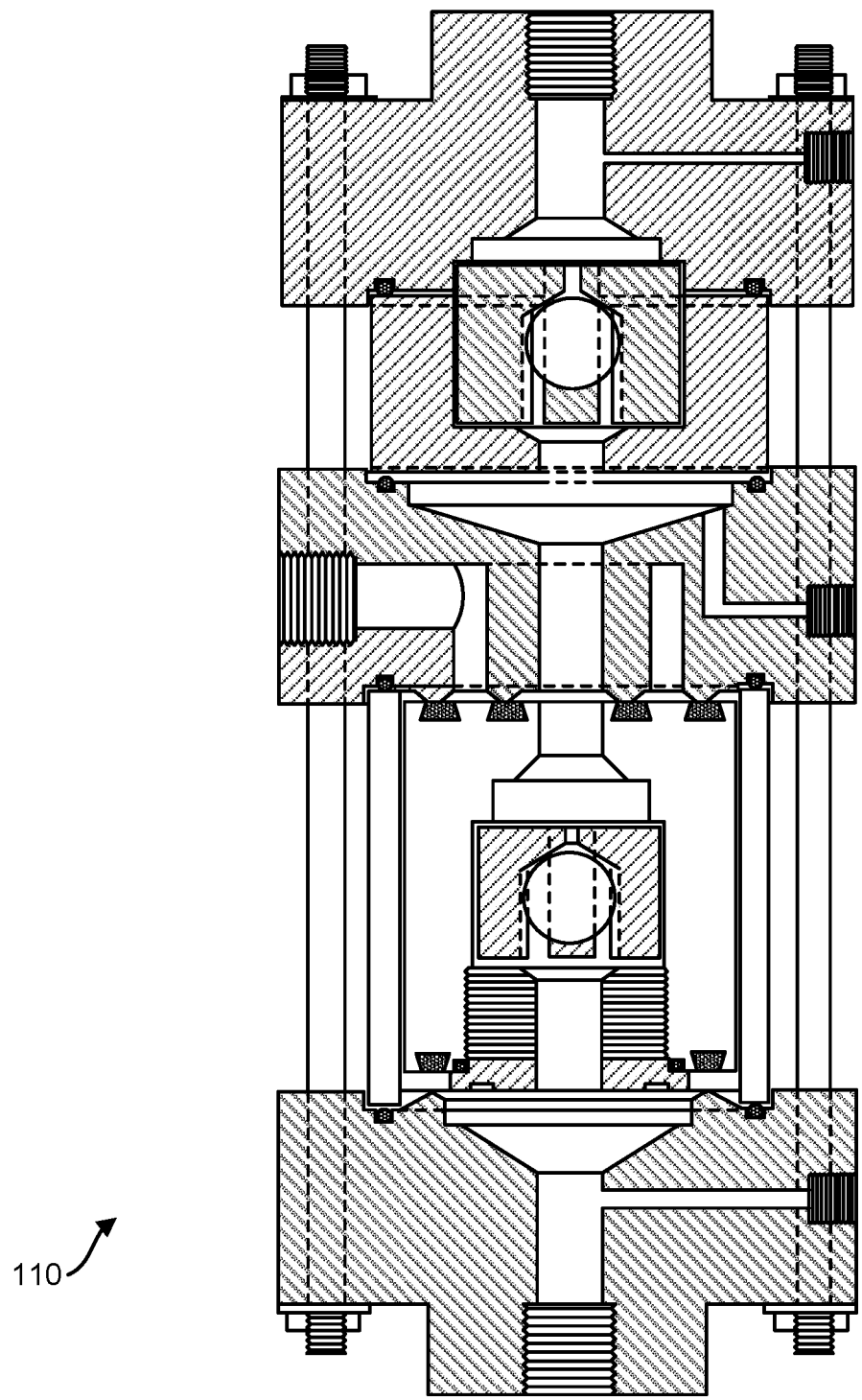
FIG. 1A is a longitudinal cross section similar to FIG. 1, showing the backflow prevention device in a normal flow position.
Figure 1B:
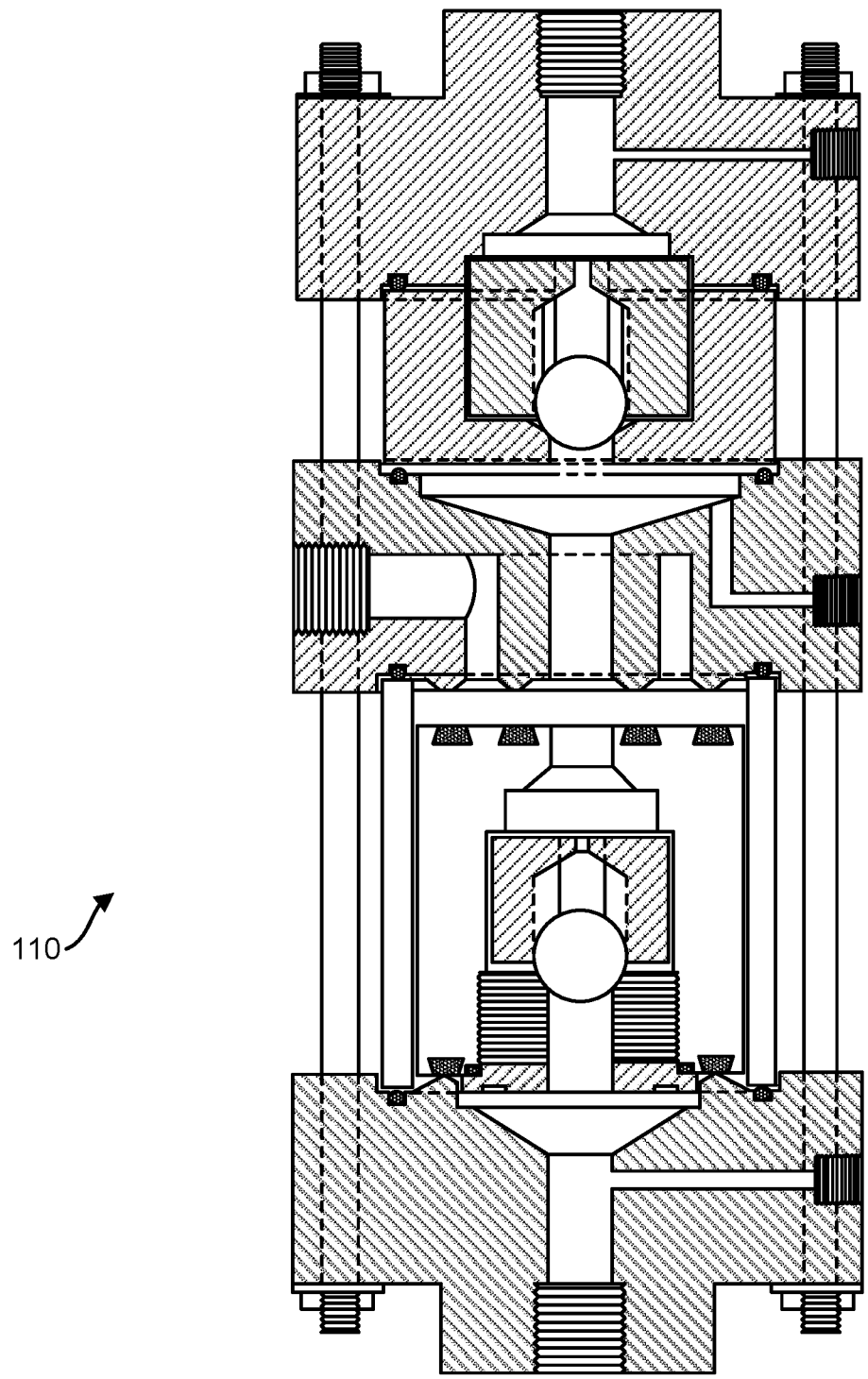
FIG. 1B is a longitudinal cross section similar to FIG. 1 showing the backflow prevention device in a backflow position.

The piston chamber body member 132 comprises a cylindrical tube arranged end-to-end between the inlet body member 130 and the relief port body member 134. The piston chamber body member 132 is configured to receive the piston 120 therein to allow for movement of the piston between the normal flow position (FIG. 1A) and the backflow position (FIG. 1B).

In the illustrated embodiment, the piston 120 comprises an assembly including a piston member 160, a set of compressible gaskets 162, 164, 166, 168, and an internal check valve 170. The illustrated piston member 160 has a smooth, non-sealing outer perimeter wall, but it is contemplated that the piston member could be fitted with a gasket to seal the interface between the outer perimeter wall of the piston member and the inner perimeter wall of the piston chamber body member 132 without departing from the scope of the disclosure. The piston member 160 has an upstream end portion and a downstream end portion spaced apart along the axis A. The piston member 160 defines a piston passage 172 that extends along the axis A from the upstream end portion through the downstream end portion for passing water from the inlet port 114 to the outlet port 116 during normal flow.

An annular groove is formed in the upstream end portion of the piston member 160 (radially outboard of the piston passage 172) for receiving an annular compressible gasket 162, referred to hereafter as the backflow seal. In general, the backflow seal 162 is configured to sealingly engage the inlet body member 130 when the piston is in the backflow position. More particularly, the backflow seal 162 is configured to be compressed against the backflow valve seat 148 during a backflow to provide a fluid seal of the interface between the piston member 160 and the inlet body member 130.

Concentric inner and outer annular grooves are formed in the downstream end portion of the piston member (both radially outboard of the piston passage 172) for receiving respective annular compressible gaskets 164, 166, referred to hereafter as the inner and outer relief seals. The relief seals 164, 166 are broadly configured to sealingly engage the relief port body member 134 when the piston 160 is in the normal flow position. More particularly, the inner and outer relief seals 164, 166 are configured to be compressed against the inner and outer relief valve seats 150, 152 during normal flow conditions to provide a fluid seal of the interface between the piston member 160 and the relief port body member 134. The fluid seal provided by the relief seals 164, 166 isolates the relief port 122 from the device passage 118.

The illustrated piston 120 comprises a caged ball check valve assembly 170 (more generally, a ball check valve, or more broadly still, a check valve). The caged ball check valve assembly 170 comprises a cage member 174, a seat member 178, and a ball seal 176 between the cage member and the seat member. In use, the caged ball check valve assembly 170 is assembled in the piston passage 172 such that seat member 178 defines an upstream end portion the caved ball valve assembly, the cage member 174 defines the downstream end portion of the caged ball check valve assembly, and the ball seal 176 is caged between the cage member and seat member such that the ball seal can move between (i) a normal flow position in which the ball seal is pressed in a downstream direction against the cage member and allows fluid to flow across the caged ball check valve assembly and (ii) a backflow position in which the ball seal is pressed in an upstream direction against the seat member to block flow through the check valve 170.

Figure 2:
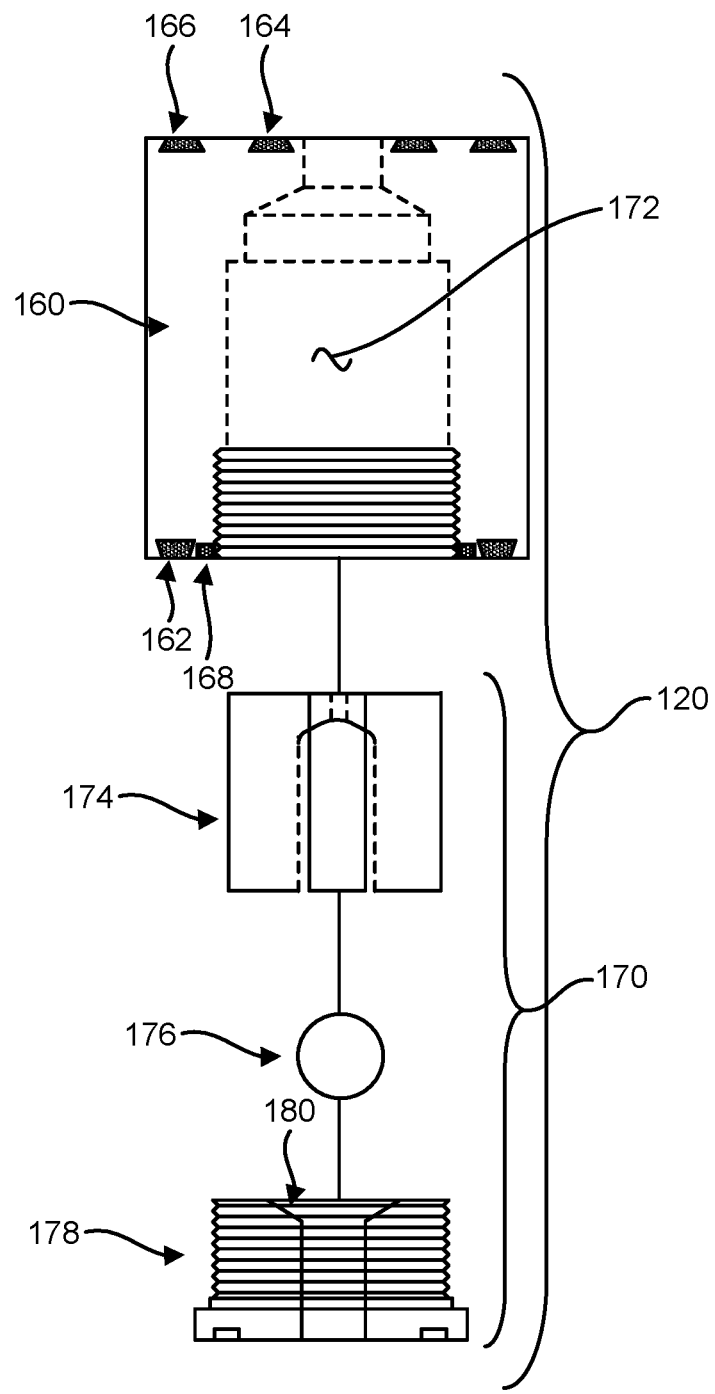
FIG. 2 is an exploded cross section of a piston of the backflow prevention device.
Figure 3:
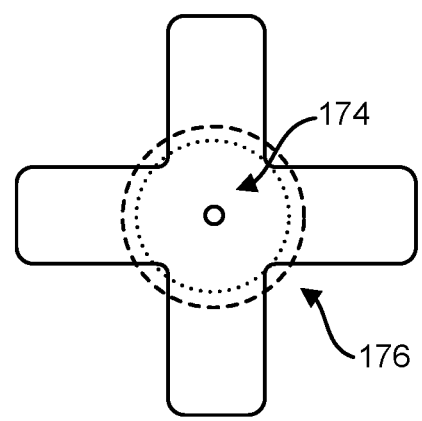
FIG. 3 is a top plan view of a cage member and a ball seal of the piston.
Figure 4:
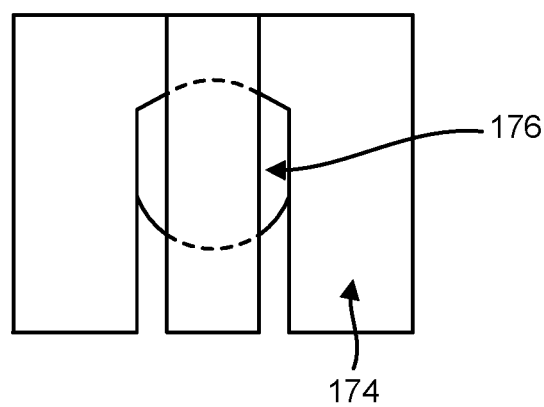
FIG. 4 is an elevation of the cage member and the ball seal.
Figure 5:
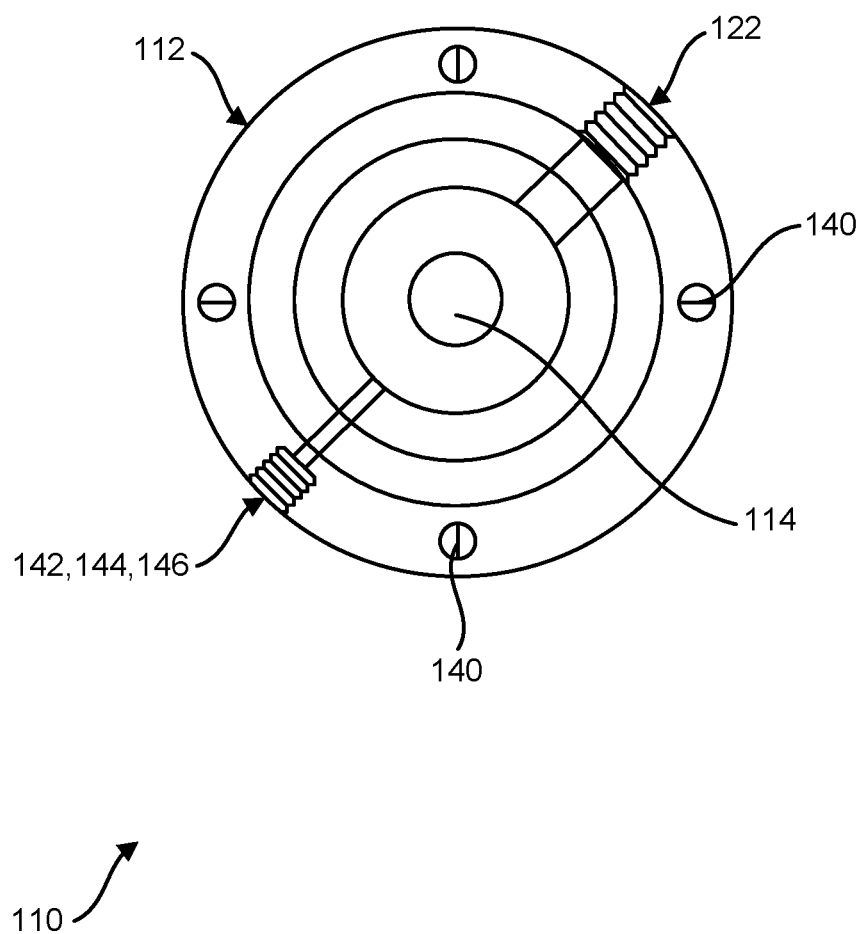
FIG. 5 is a top plan view of the backflow prevention device, showing the locations of test ports and a relief port in relation to draw rods.

As shown in FIGS. 2-4, the cage member 174 has an open upstream end portion and a caged downstream end portion spaced apart from the upstream end portion along the axis A. The cage member comprises a set of circumferentially spaced apart legs that extend along the axis from the upstream end portion toward the downstream end portion and extend radially inward along the downstream end portion such that they come together at a central hub at the downstream end portion. The ball seal 176 comprises a compressible (e.g., rubber or rubberized material) spherical ball passable into the cage member 174 through the open upstream end portion thereof. In normal flow conditions, the flowing water presses the ball upward against the downstream end portion of the cage member 174. The legs of the cage member 174 are sized and arranged so that the water can flow freely around the ball seal 176 through the circumferential gaps between the legs. Thus, under normal flow conditions, the caged ball valve 170 allows water to flow across the ball seal 176 from the inlet port 114 toward the outlet port 116 of the device 110.

The seat member 178 has an upstream end portion and a downstream end portion spaced apart along the axis A. The illustrated seat member 178 includes a gasket flange at the upstream end portion and an externally threaded shaft section extending from the gasket flange along the axis. The gasket flange supports a compressible annular gasket 168, and the threaded shaft section is configured to threadably fasten to an internally threaded receptacle at the upstream end portion of the piston passage 172. When the threaded shaft section is fully threaded into the receptacle, the flange compresses the gasket against the upstream end section of the piston member to seal the interface between the seat member 178 and the piston member 160. The downstream end portion of the seat member 178 defines a ball valve seat 180 against which the ball seal 176 is compressed to seal the piston passage 172 when pressure in the middle segment 118 of the device passage is greater than pressure at the inlet port 114 (e.g., during backflow).

In the illustrated embodiment, the downstream check valve 124 similarly comprises a caged ball check valve. It will be understood, however, that one or both of the check valves 124, 170 could be replaced with another type of check valve in certain embodiments. The downstream caged ball check valve 124 includes an upstream valve seat 182 defined by the downstream check valve body member 136, a cage member 184 substantially similar to the cage member 174, and a ball seal 186 caged between the downstream end portion of the cage member and the upstream valve seat 178 in essentially the same way that the caged ball member 176 is caged between the downstream end portion of the cage member 174 and the upstream valve seat 180. Like the piston check valve 170, the downstream caged ball check valve 124 is configured to open in normal flow conditions and close during back flow. In normal flow conditions, the ball seal 186 is pressed against the downstream end portion of the cage member 184, allowing water to flow through the check valve 124 around the ball seal and between the legs of the cage member 184. Under back flow, back pressure applied at the outlet port 116 or siphon emanating from the inlet port 114 presses the ball seal 186 against the valve seat 182 to seal closed the device passage 118.

During use, the backflow prevention device 110 is preferably installed on a water supply line immediately between upstream and downstream shutoff valves (not shown). In an exemplary embodiment, the backflow prevention device 110 is installed vertically such that the device passage 18 extends along a vertical axis (e.g., the axis A is a vertical axis) and the inlet port 114 is below the outlet port 116 along the vertical axis. The inventors believe that vertical installation of the backflow prevention device 110 provides advantages over conventional horizontal backflow prevention devices such as RPZs. For example, the inventors believe that, in the vertical orientation, it is very difficult for debris to become lodged between the moving valve components. Those skilled in the art will recognize that such debris causes the valves of conventional RPZs to fail open. By contrast, in a vertically installed backflow prevention device 110 gravity and/or water flow will tend to draw debris out of the interfaces between the moving parts, mitigating against valve failure.

Upon initial installation in the vertical orientation, before the water is turned on, all of the moving parts of the backflow prevention device 110 will fall downward under their own weight. As explained in further detail below, one or more of the moving parts can also be urged in the upstream direction by one or more springs. Thus, the piston 120 rests on the inlet body section 130, the piston's ball seal member 176 falls onto the valve seat 180, and the downstream ball seal member 186 rests on the downstream valve seat 182. When the water is turned on, it flows through the inlet port 114 and upward along the device passage 118. Initially, the flowing water drives the ball seal 176 upward toward the downstream end portion of the cage member 174, opening the piston check valve 170 and flowing through the piston passage 172. Water thus begins to flow upward along the piston passage 172 and the interior of the piston chamber 132. As water fills the interior of the piston chamber 132, fluid advances through the relief port 122, creating suction at the upstream end portion of the relief port. Together, this suction and the hydraulic force of the water pressing against the upstream end of the piston 120 draw the piston upward off of the backflow valve seat 148 to the normal flow position shown in FIG. 1A. The downstream end portion of the piston 120 presses firmly against the relief port body member 134 so that the seals 164, 166 seal against the relief valve seat 150, 152 to isolate the relief port 122 from the device passage 118. The water continues to flow downstream along the device passage 118 and enters the downstream check valve body portion 136. The water lifts the downstream ball seal 186 off of the valve seat 182 and opens the downstream check valve 124. Thus, the device passage 118 is opened so that water can flow freely through the backflow prevention device 110 from the water supply to the user. FIG. 1A shows the backflow prevention device in the normal flow position.

The piston relief valve 120 and the downstream check valve 124 will remain open (thus isolating the relief port 122 and allowing flow from the water supply to the user) unless back flow occurs due to backpressure or back siphon. During transient backpressure or supply pressure fluctuations that present as either a small increase in user-side pressure or a small decrease in supply-side pressure, unlike a conventional RPZ, the backflow prevention device 110 will not discharge water from the relief port 122. In some backpressure or back siphon events, only the downstream check valve 124 will close. These events can create greater pressure downstream of the check valve 124 than upstream. This differential pressure presses the ball seal 186 against the seat 182 so that no water from the user can backflow through the inlet port 114 into the supply.

In certain circumstances, such as when the downstream check valve 124 fails or when there is a very substantial back siphon, there will be greater pressure downstream of the piston 120 than upstream. This condition closes the piston ball check valve 170 and drives the relief piston 120 downward against the backflow valve seat to the backflow position (FIG. 1B). The piston 120 thus closes the device passage 118 to limit user backflow through the inlet port 114 into the supply. Additionally, the piston 120 opens the relief port 122 to provide a vacuum break and release any water retained in the middle segment of 118A of the device passage.

The inventors believe that the above-described backflow prevention device 110 provides effective backflow protection for high hazard applications and substantially reduces the amount of water that flows through the relief port under normal conditions when compared with conventional high hazard devices such as RPZs. In typical, transient decreases in supply pressure relative to downstream user pressure, at most, the downstream check valve 124 will close. The piston 120 does not open the relief port 122 unless there is true backflow and thereby prevents water from being discharged. But of course, the piston 120 will still prevent backflow in any true backflow event.

In an exemplary embodiment, none of the water-contact components of the backflow prevention device are made of metal. For example, the body members 130, 132, 134, 136, 138, the cage members 174, 184, and the seat member 178 are formed from a plastic, and the seals/gaskets 162, 164, 166, 168, 176, 186 are formed from rubber or rubberized polymer material. Those skilled in the art will recognize that this minimizes the potential for parts to degrade and foul the device. Furthermore, any of these device parts can be replaced individually with ease, by simply removing the draw rods 140, disassembling the device 110, replacing the parts in question, reassembling the device, and re-tightening the draw rods.

After being put into service, the backflow prevention device 110 is configured to enable periodic testing of the piston 120 and the downstream check valve 124. An exemplary method of testing the backflow prevention device 110 will now be briefly described. Initially, while the device 110 remains under pressure, the test cocks in each of the test ports 142, 144, 146 are individually opened then closed. Next, the tester installs a pressure gauge (e.g., a 100 psi gauge) on the test cock in port 144, opens this test cock, and obtains a reading of system pressure. Subsequently, the shutoff valves immediately upstream and downstream of the device 110 are closed. After closing the shutoff valves, the tester slowly opens the test cock in upstream port 142. In response, water drains through the opened test cock, gauge pressure should decrease, and the piston 120 should move to the backflow position, causing a water discharge from the relief port 122. If the piston 120 moves to the backflow position and there remains a low flow of water out of upstream port 142, it is an indication that there is a minor leak in the shutoff valve upstream of the inlet port. If the piston 120 does not close and water pours out of port 142 at a substantial flow rate, it is an indication of a major leak in the shutoff valve upstream of the inlet port. If no issues with the upstream shutoff valve are identified, the gauge pressure will decrease to 0 psi. If water continues to flow or drip from port 142, it is an indication that the backflow seal 162 at the upstream end portion of the piston 120 has failed and needs to be replaced.

After performing the above-described testing steps, the tester next closes the test cock at port 142, removes the pressure gauge from the test cock in middle port 144, and closes the middle test cock. Next, the tester connects the pressure gauge to the test cock at downstream port 146 and opens the inlet end shutoff valve upstream of the inlet port 114. A small amount of water will discharge from the relief port 122, and then the piston 120 will open the device passage 118 and close the relief port 122. The tester then opens the downstream test cock at port 146 so that the pressure gauge shows system pressure. Next, the tester closes the inlet end shutoff valve upstream of the inlet port 114. With the pressure gauge operatively connected to the downstream test cock, the tester opens the test cock in middle port 144. If the device is functioning properly, the pressure reading on the gauge will decrease slightly and stabilize. The tester maintains this configuration for one minute to ensure the device holds the system pressure. If the pressure does not stabilize (e.g., if the pressure reading continues to decrease), it is an indication that the downstream check valve 124 is leaking and should be replaced.

To complete the testing procedure, the tester closes the downstream test cock in port 146 and removes the pressure gauge. The shutoff valve connected to the inlet port 114 is then opened, causing a small discharge of water from the relief port 122 before the piston 120 moves to the normal flow position and closes the relief port. Next, the downstream test cock in port 146 is opened to bleed air from the device 110, and once the air is bled, the downstream test cock is closed. The downstream shutoff downstream of the outlet port 116 is then slowly opened to put the device 110 back into service.

No testing is required to indicate a failure of the relief seal 164, 166. In that event of failure of the relief seal, while the device 110 is in service, water will discharge from the relief port.

In view of the above, those skilled in the art will recognize that the test device 110 enables all operational seals to be tested with only one standard pressure gauge. By comparison, conventional large capacity backflow prevention devices such as RPZs and dual check valves require application specific gauge sets or testing. Such devices can be very expensive and require specialized knowledge and training for effective use.

Figure 6:
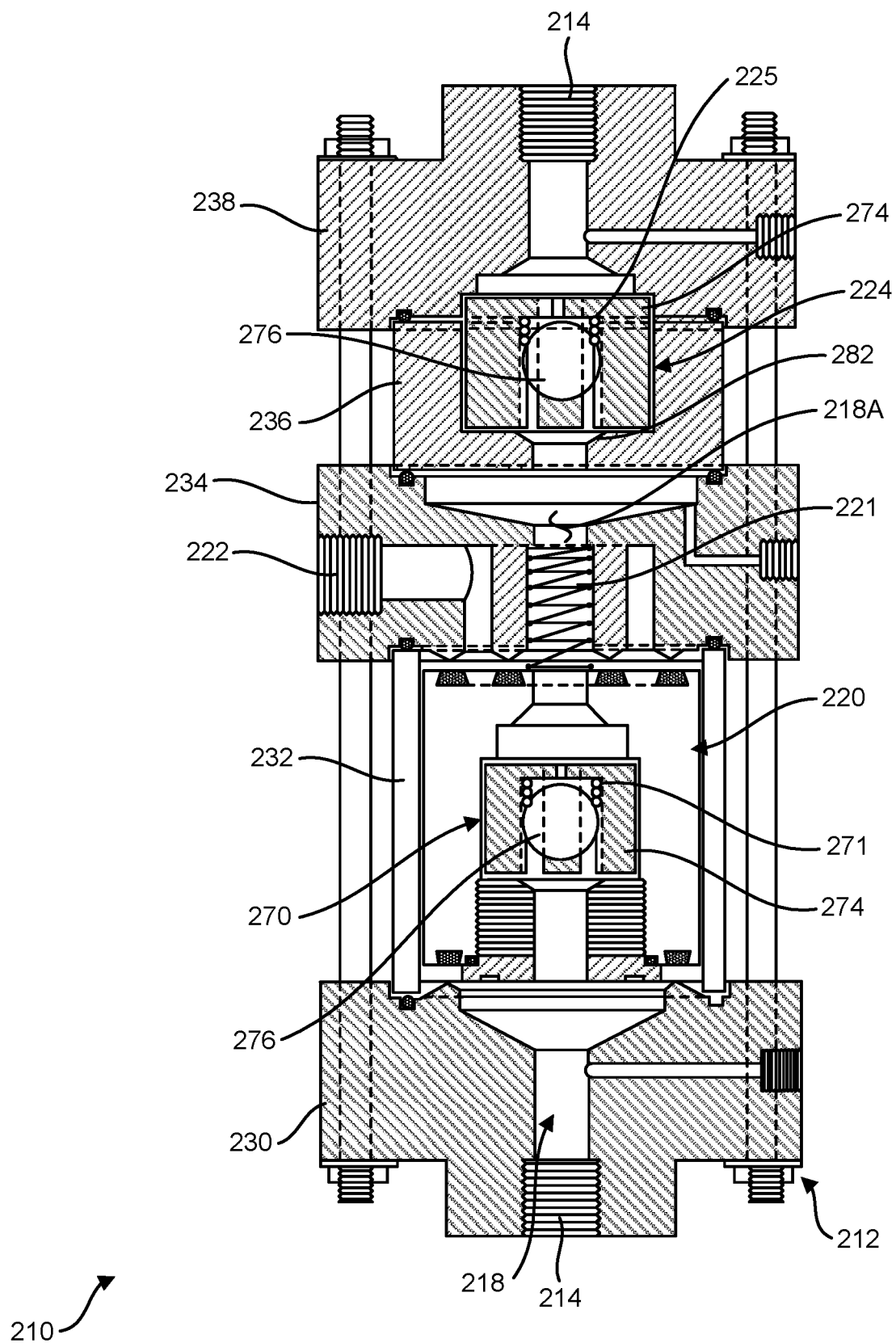
FIG. 6 is a longitudinal cross section similar to FIG. 1 of another embodiment of a backflow prevention device.

Referring to FIG. 6, another embodiment of a backflow prevention device 110 encompassed in the scope of the present disclosure is generally indicated at reference number 210. The backflow prevention device 210 is similar in most respects to the backflow prevention device 110. Parts of the device 210 corresponding to parts of the device 110 are given the same reference number, plus 100. Like the device 110, the backflow prevention device 210 comprises a device body 212 formed from a plurality of body members 230, 232, 234, 236, 238 held together end-to-end by a set of draw rods 240. A piston 220 is located along the device passage 218 between an inlet port 214 and an outlet port 216, and a downstream check valve 224 is located along the device passage between a middle segment 218A of the device passage and the outlet port 216. A relief port 222 is formed in the relief port body member 234 for fluid communication with the middle segment 218A of the device passage 218.

The piston 220 is configured to function substantially the same way as the piston 120, except that it includes a spring 221 yieldably biasing the piston toward the backflow position. The illustrated spring 221 comprises a compression spring between the downstream end of the piston 220 and a shoulder formed in the relief port body member 232. In one or more embodiments, the spring 221 biases the piston 220 toward the backflow position with about 5 psi of pressure. Those skilled in the art will recognize that the spring 221 may be used to help the device 210 better conform to one or more regulatory requirements for upstream check valves in high hazard backflow prevention applications. Whereas in the backflow prevention device 110, the piston 120 is configured to be driven between the normal flow position and backflow position solely by operational fluid pressure in the backflow prevention device, in the backflow prevention device 210, the piston 220 is urged toward the backflow position by the spring 221. The inventors have found that, during operation, the piston return spring does not affect (e.g., reduce) line pressure at the outlet of the device 210.

In the illustrated embodiment, the piston ball valve 270 also includes a spring 271 between the downstream end portion of the cage member 274 and the ball seal 276. The spring 271 yieldably biases the ball seal 276 toward sealing engagement with the valve seat 280 of the seat member 278. Similarly, the illustrated downstream check valve 224 comprises a spring 225 between the downstream end portion of the cage member 284 and the ball seal 286. The spring 225 likewise yieldably biases the ball seal toward sealing engagement with the valve seat 282 of the body member 236. In one or more embodiments, one or both of the springs 271, 225 can act on the respective ball seal 276, 286 with about 8 ounces of force. It will be appreciated that any of the springs 221, 225, 271 can be included or omitted depending on the application requirements (e.g., regulatory requirements). When all three springs 221, 225, 271 are employed, it is possible to operatively install the backflow prevention device in a horizontal orientation wherein the device passage extends along a horizontal axis.

Unexpectedly, the inventors have discovered that even when all of the springs 221, 225, 271 are included, the pressure loss across the device is less than conventional high hazard backflow prevention devices such as RPZs, e.g., on the order of or less than 1 psi.

Figure 7:
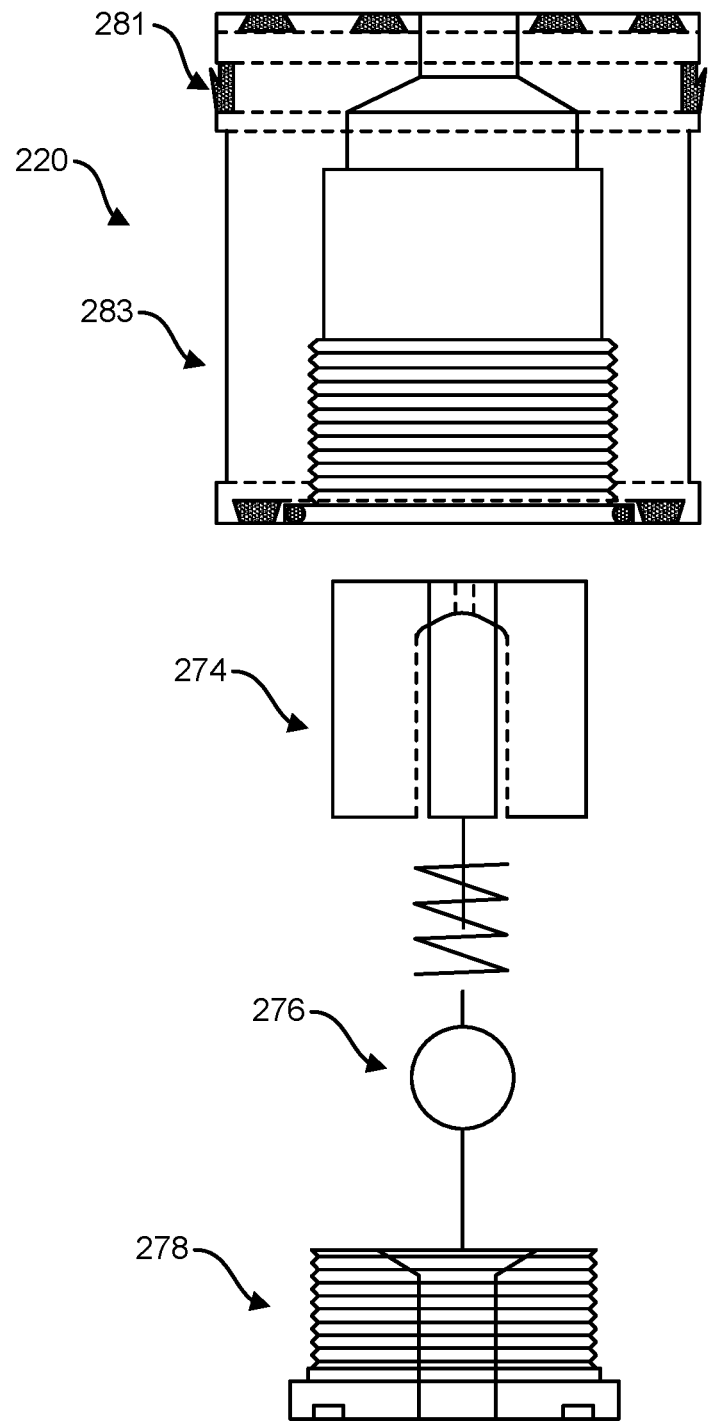
FIG. 7 is an exploded cross section of a piston similar to FIG. 2 but showing another embodiment of a piston.

Referring to FIG. 7, the inventors further contemplate that another modification to the backflow prevention device 210. One or more perimeter seals 281 (broadly, annular compressible gaskets) could be fitted onto the exterior perimeter of a piston 220 to provide a fluid seal between the piston and the piston chamber 232. Perimeter seals would provide an additional limitation on backflow into the supply and also aid in aligning the piston 220 during its movement. With perimeter seals 281 provided, there is no potential for user contamination to migrate around the piston 220 into the water supply. The spring 221 aids in overcoming the frictional resistance imparted by the added seals 281 to the piston 220 returning to the backflow position in the event of backflow. Furthermore, the illustrated piston 220 includes a perimeter recess 283 that reduces contact area between the piston and the piston chamber 233, further minimizing frictional resistance to valve operation.

As explained above, the inventors believed that the above describe backflow prevention devices can be useful in high hazard applications. One application for the devices 110, 210 is to provide backflow prevention to building fire safety systems. RPZs are oftentimes ill-suited to this application because they are prone to frequent water discharge, which may unacceptable. By contrast, the above-described backflow prevention devices 110, 210 discharge little to no water unless there is a true risk of backflow. And even in true backflow events, the amount of water discharge has been found to be very small, provided that the downstream check valve 124, 224 is in good working order. The backflow prevention devices 110, 210 are also thought to be suitable for other high hazard applications and lower hazard applications where backflow prevention is desired.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A backflow prevention device comprising:
a device body having an inlet end portion and an outlet end portion opposite the inlet end portion, the outlet end portion spaced apart from the inlet end portion along an axis, the inlet end portion defining an inlet port, the outlet end portion defining an outlet port, the device body defining a device passage connecting the inlet port to the outlet port;
a piston received in the device passage between the inlet port and the outlet port, the piston comprising a piston member having an upstream end surface and a downstream end surface spaced apart along the axis;
wherein the device passage comprises a middle segment between the piston and the outlet port and the device body defines a relief port configured for fluid communication with the middle segment of the device passage,
wherein the piston is movable between a normal flow position in which the piston blocks fluid communication between the relief port and the middle segment of the device passage and a backflow position in which the piston allows fluid communication between the relief port and the middle segment of the device passage, the piston being configured to move to the normal position in response to normal flow through the device passage from the inlet port toward the outlet port and configured to move to the backflow position in response to greater pressure in the middle segment than in the inlet port;
wherein the relief port opposes the downstream end surface of the piston member such that atmospheric pressure acts on the downstream end surface of the piston member through the relief port.

2. The backflow prevention device as set forth in claim 1, wherein the piston has an upstream end portion, a downstream end portion, and a piston passage extending from the upstream end portion through the downstream end portion configured to provide fluid communication between the inlet port and the middle segment of the device passage.

3. The backflow prevention device as set forth in claim 2, further comprising an internal check valve along the piston passage.

4. The backflow prevention device as set forth in claim 3, wherein the internal check valve comprises a ball check valve.

5. The backflow prevention device as set forth in claim 4, wherein the ball check valve comprises a ball seal and a spring yieldably biasing the ball seal to a position at which the ball seal closes the ball check valve.

6. The backflow prevention device as set forth in claim 3, wherein the internal check valve is configured to close in response to greater pressure in the middle segment than in the inlet port and open in response to normal flow through the device passage from the inlet port toward the outlet port.

7. The backflow prevention device as set forth in claim 2, wherein the device body comprises a backflow valve seat, a normal flow valve seat, and a piston chamber extending from the backflow valve seat to the normal flow valve seat.

8. The backflow prevention device as set forth in claim 7, wherein the piston is received in the piston chamber for movement along the piston chamber between the normal flow position and the backflow position.

9. The backflow prevention device as set forth in claim 8, wherein the downstream end portion of the piston sealably engages the normal flow valve seat in the normal flow position and the upstream end portion of the piston sealably engages the backflow valve seat in the backflow position.

10. The backflow prevention device as set forth in claim 9, wherein the normal flow valve seat comprises first and second concentric annular valve seat portions and the relief port opens through the valve body between the first and second concentric annular valve seat portions.

11. The backflow prevention device as set forth in claim 10, wherein the downstream end portion of the piston comprises first and second annular compressible gaskets.

12. The backflow prevention device as set forth in claim 9, wherein the upstream end portion of the piston comprises an annular gasket.

13. The backflow prevention device as set forth in claim 9, further comprising a spring configured to yieldably bias the piston to the backflow position.

14. The backflow prevention device as set forth in claim 1, further comprising a downstream check valve along the device passage between the middle segment of the device passage and the outlet port.

15. The backflow prevention device as set forth in claim 14, wherein the downstream check valve comprises a ball check valve.

16. The backflow prevention device as set forth in claim 1, wherein the backflow prevention device is configured to install vertically such that the device passage extends along a vertical axis and the inlet port is below the outlet port along the vertical axis.

17. The backflow prevention device as set forth in claim 16, wherein the backflow position is spaced apart below the normal flow position along the vertical axis.

18. The backflow prevention device as set forth in claim 1, wherein the device body comprises:
an inlet body member defining the inlet port;
a relief port body member defining the relief port; and
a piston chamber body member arranged end-to-end between the inlet body member and the relief port body member.

19. The backflow prevention device as set forth in claim 18, further comprising draw rods holding the inlet body member, the piston chamber body member, and the relief port body member together in end-to-end relationship.

20. The backflow prevention device as set forth in claim 19, wherein the device body further comprises an outlet body member defining the outlet port and a downstream check valve body member held end-to-end between the relief port body member and the outlet body member.

21. The backflow prevention device as set forth in claim 20, where each of the inlet body member, the relief port body member, and the outlet body member defines a test port in fluid communication with the device passage.

22. The back flow prevention device as set forth in claim 20, further comprising a caged ball check valve between the outlet body member and the downstream check valve body member, the caged ball check valve including a cage member and a ball seal, the downstream check valve body member defining a valve seat against which the ball member is configured to form a seal of the device passage during backflow.

23. The backflow prevention device as set forth in claim 18, wherein the piston comprises:
a piston member having an upstream end portion and a downstream end portion, the piston member defining a piston passage extending through the piston member from the upstream end portion through the downstream end portion;
a compressible gasket on the upstream end portion of the piston member configured to sealingly engage the inlet body member when the piston is in the backflow position;
a compressible gasket on the downstream end portion of the piston member configured to sealingly engage the relief port body member when the piston is in the normal flow position; and
a caged ball check valve assembly received in the piston passage, the caged ball check valve assembly comprising a cage member, a seat member, and a ball seal between the caged member and the seat member, the ball seal configured to be pressed against the cage member during normal flow through the device passage from the inlet port toward the outlet port and configured to be pressed against the seat member in response to greater pressure in the middle segment than in the inlet port, whereby the ball seal seals the piston passage.

24. The backflow prevention device as set forth in claim 1, wherein the piston is configured to be driven between the normal flow position and the backflow position solely by operational fluid pressure in the backflow prevention device.

25. A backflow prevention device comprising:
a device body having an inlet end portion and an outlet end portion opposite the inlet end portion, the inlet end portion defining an inlet port, the outlet end portion defining an outlet port, the device body defining a device passage connecting the inlet port to the outlet port;
a piston received in the device passage between the inlet port and the outlet port;
wherein the device passage comprises a middle segment between the piston and the outlet port and the device body defines a relief port configured for fluid communication with the middle segment of the device passage,
wherein the piston is movable between a normal flow position in which the piston blocks fluid communication between the relief port and the middle segment of the device passage and a backflow position in which the piston allows fluid communication between the relief port and the middle segment of the device passage, the piston being configured to move to the normal position in response to normal flow through the device passage from the inlet port toward the outlet port and configured to move to the backflow position in response to greater pressure in the middle segment than in the inlet port;
wherein the piston has an upstream end portion, a downstream end portion, and a piston passage extending from the upstream end portion through the downstream end portion configured to provide fluid communication between the inlet port and the middle segment of the device passage;
wherein the piston is received in the piston chamber for movement along the piston chamber between the normal flow position and the backflow position;
wherein the downstream end portion of the piston sealably engages the normal flow valve seat in the normal flow position and the upstream end portion of the piston sealably engages the backflow valve seat in the backflow position;
wherein the piston is configured to be driven between the normal flow position and the backflow position solely by operational fluid pressure in the backflow prevention device.

\* \* \* \* \*